United States Patent [19]

Burgess, Jr.

[11] Patent Number: 4,611,704

[45] Date of Patent: Sep. 16, 1986

[54] VIBRATORY FEEDING WORK STATION MODULE AND SYSTEM

[76] Inventor: Warren C. Burgess, Jr., 3685 E. Lake Rd., Sheffield Lake, Ohio 44054

[21] Appl. No.: 581,581

[22] Filed: Feb. 21, 1984

Related U.S. Application Data

[63] Continuation-in-part of Ser. No. 310,083, Oct. 9, 1981, Pat. No. 4,444,303.

[51] Int. Cl.[4] .......................................... B65G 47/00
[52] U.S. Cl. ................................ 198/345; 198/465.1; 198/771
[58] Field of Search ............... 198/345, 472, 750, 752, 198/755, 771, 491, 492, 465.1, 463.4, 463.6

[56] References Cited

U.S. PATENT DOCUMENTS

| | | | |
|---|---|---|---|
| 2,988,234 | 6/1961 | Barothy et al. | 198/472 |
| 3,313,393 | 4/1967 | Solski et al. | 198/472 |
| 3,347,180 | 10/1967 | Phillips et al. | 198/472 |
| 3,650,373 | 3/1972 | Kern et al. | 198/472 |
| 3,690,433 | 9/1972 | Buldini | 198/472 |
| 3,752,295 | 8/1973 | Hubbell et al. | 198/491 |
| 4,050,572 | 9/1977 | Armstrong | 198/771 |
| 4,291,797 | 9/1981 | Ewertowski | 198/472 |
| 4,444,303 | 4/1984 | Burgess | 198/472 |
| 4,492,297 | 1/1985 | Sticht | 198/345 |

Primary Examiner—Joseph E. Valenza
Attorney, Agent, or Firm—Fay, Sharpe, Fagan, Minnich & McKee

[57] ABSTRACT

A work station module which includes a buffer storage area (B) for the transitory storage of workpiece carriers (A) which are received at non-specific intervals and an escapement station (C) to facilitate performance of some operation of a workpiece carried by each carrier. The buffer storage area includes a conveying surface (30) which is defined by a multiplicity of fibers (36) and which is vibrated to move the carriers longitudinally therealong. The resiliency of the fibers permits carriers which are adjacent the escapement station to remain stationary even though the conveying surface is vibrating. A directing rail (50) extends upward through the fibers and terminates just below their upper surface such that the carriers are supported on the fibers and not the directing rail. The carrier includes a plurality of pins (18, 20) which extend downward therefrom to define a slot for receiving the rail. At the escapement station, the carriers are decelerated by engagement with a friction drag surface (62) and are brought into general alignment with the escapement station by a stop surface (60). The carriers are lifted by arms (72) and brought into more accurate alignment with the escapement station by the interaction of pins (70) on the arms and bushings (24) in the carriers. A precision alignment pin (90) and an associated bushing (26) bring the carrier and escapement station into accurate alignment to facilitate performance of an automatic operation on the workpiece carried thereon.

1 Claim, 5 Drawing Figures

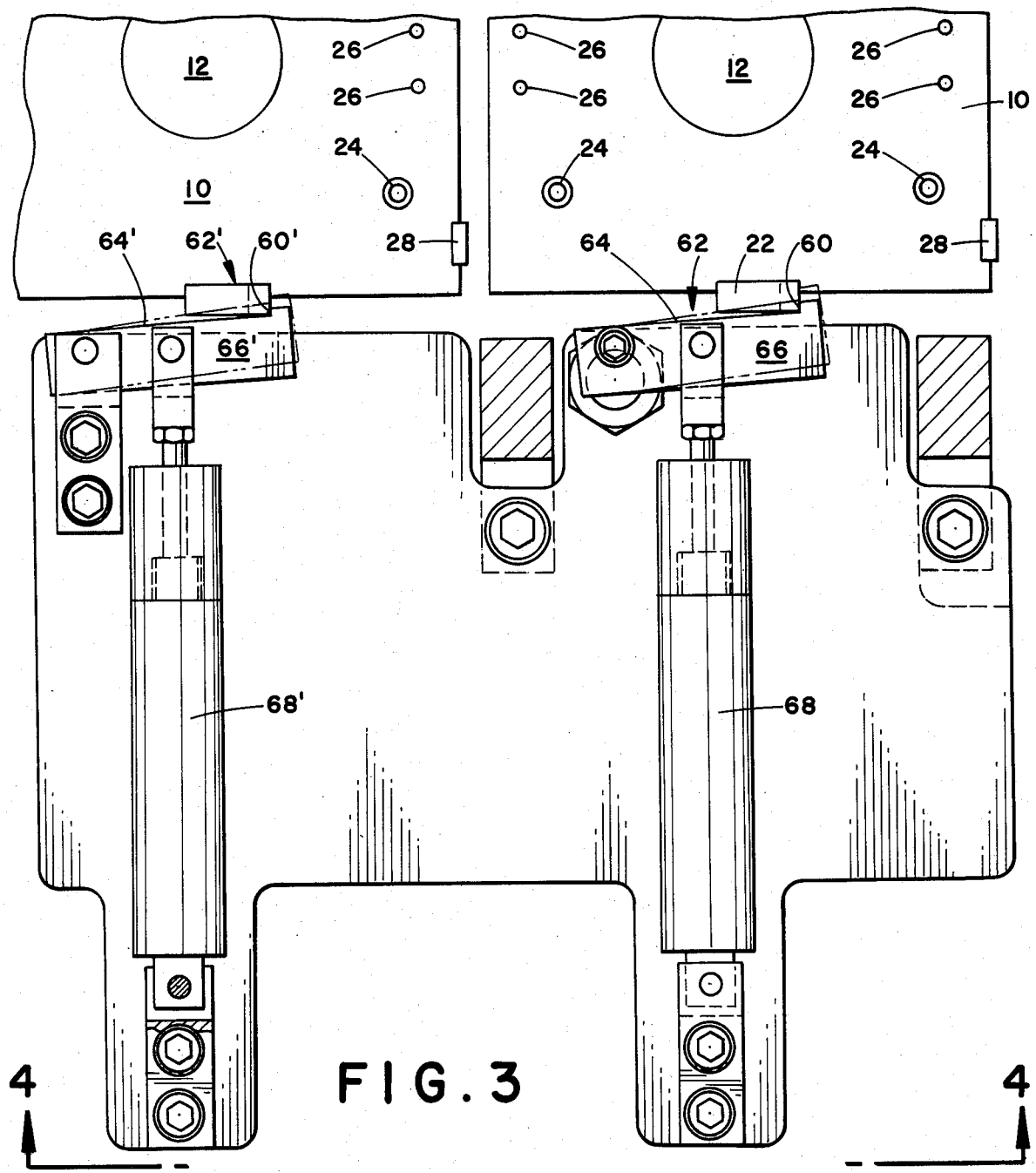
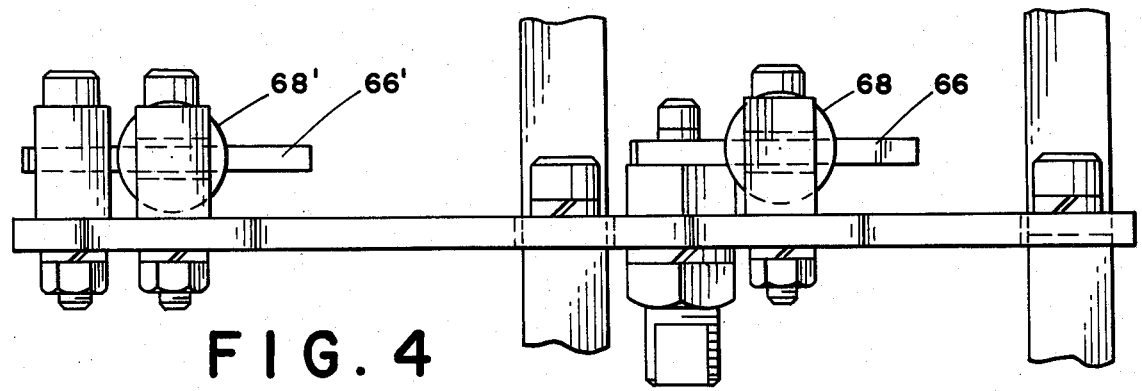
FIG. 3
FIG. 4

VIBRATORY FEEDING WORK STATION MODULE AND SYSTEM

BACKGROUND OF THE INVENTION

This application is a continuation-in-part of application Ser. No. 310,083, filed Oct. 9, 1981, now U.S. Pat. No. 4,444,303.

This application pertains to the art of workpiece handling and particularly to vibratory feeders for handling and conveying workpieces between successive work or escapement stations.

The invention is particularly applicable to interconnectable modular work stations which may be connected end to end in an array such that the workpieces are moved from module to module. Each module is adapted to facilitate a specific manufacturing operation or function such as assembly, polishing, drilling, and the like. Fundamental to this invention, each module may operate on a permissive basis, i.e., as soon as a carrier is in place, the operation of that particular module is executed. Each module therefore operates independently from all other modules. This system is often referred to as a non-synchronous system. In a synchronous system stations must operate simultaneously. It will be appreciated, however, that those skilled in the art may readily adapt the invention to other manufacturing operations as well as to alternative handling and processing arrangements or environments.

Heretofore, various non-synchronous manufacturing assemblies have been devised in which workpieces are placed on a pallet or other carrier and moved automatically from one work station to another. In one such assembly, a series of pallets were adapted for selective engagement with and disengagement from a continuously moving chain. When a pallet reached a work station, it automatically disengaged the chain in anticipation of the operation being performed. Once the operation had been completed, the pallet reengaged the chain and was moved to the next work station. In that system, the pallets tended to be suddenly accelerated and deaccelerated resulting in frequent impacts with each other. Moreover, the equipment utilized was slower than synchronous systems, complicated, expensive, and best suited for use with large workpieces such as engine blocks, transmission assemblies, and the like.

Others in the field have made non-synchronous systems in which independent belt drives moved pallets containing workpieces between work stations. The belt drives could be interrupted between work stations to allow the pallet and attached workpieces to be tipped, rotated, moved at 90° or other angles, or otherwise have their orientation adjusted to facilitate the next operation. To protect employees from the belt drives, extensive guards were required therealong. On a given belt, the pallets were maintained at fixed intervals which could not be contracted or eliminated. Further, the belts were constrained to move all pallets along the belt simultaneously and, thus, could not receive a pallet at one end without sliding the belt along the underside of the carriers held stationary thereon, causing excessive belt wear and maintenance. Such systems, again, were complicated, expensive and not well suited to the assembly of moderate or small components. Further, the speed of such systems was not easily changed or adjusted to accommodate productivity improvements that accompany putting a machine into production.

Vibratory feeders have been used for many years to convey workpieces from one location to another. The jostling movement caused by vibratory feeders is unsuitable for some subassemblies, workpieces, or partially assembled workpieces. For example, if a shallow race containing a plurality of ball bearings were to be transported, the ball bearings would tend to bounce out of the race. A similar problem would tend to arise in the other prior art systems in which the pallets were accelerated or deaccelerated suddenly. It is further known in vibratory feeders to line the feeder with polypropylene fiber material to reduce noise and protect delicate parts.

SUMMARY OF THE INVENTION

The present invention contemplates a new and improved non-synchronous conveying system which overcomes the above-referenced problems and others. A plurality of workpiece carriers are directed along a fiber conveying surface by a guide rail system. A motivating means continuously urges the carriers along the conveying surface. Stop means selectively stop the carriers to facilitate performance of manual, semi-automatic, or automatic operations on the carried workpieces.

In accordance with a more limited aspect of the present invention, a decelerating means is provided in conjunction with the stop means for decelerating the carriers to a smooth stop.

In accordance with another more limited aspect of the present invention, an escapement station is provided in association with at least some of the stop means. As the escapement station lifts each carrier which has been preliminarily aligned by the stop means, the carrier is brought into more accurate alignment. With continued lifting, a third aligning means brings the carrier into precise alignment with the escapement station.

In accordance with yet another aspect of the invention, a plurality of escapement stations are provided along the conveying surface. Buffer storage areas are provided upstream from at least some of the escapement stations. When a system is first set up, manual operations may be performed at many of the escapement stations. As the production rate increases, the manual operation escapement stations may be replaced by semi-automatic and automatic stations.

A principal advantage of the present invention is that workpieces are started, stopped, and conveyed smoothly, quietly, and quickly between escapement or work stations without disrupting partially assembled or manufactured workpieces. The workpieces may be conveyed at two to four times the speed of normal vibratory feeders. Such a non-synchronous system runs at speeds comparable to synchronous systems.

Another primary advantage of the present invention is that workpiece carriers or boats are started, conveyed, and stopped on a conveying surface virtually without wear on the carriers or conveying surface.

Another advantage of the invention resides in the provision of a work station module which may be readily interconnected with similar or different modules to facilitate performing a preselected sequence of manufacturing operations.

A further advantage of the invention is in the provision of a free flow or free wheeling, non-synchronous type system where each of the interconnected station modules handles the workpieces independently of the other modules.

Another advantage is the precision positioning of workpieces relative to an automated tool or the like, up to five times the precision of synchronous systems.

Yet another advantage of the invention is that it provides means which are readily adapted or converted to performing a variety of workpiece operations such as assembling, drilling, polishing, inspecting, and the like.

Still further advantages will become readily apparent to those skilled in the art upon reading and understanding the following detailed description.

BRIEF DESCRIPTION OF THE DRAWINGS

The invention may take physical form in various parts and arrangements of parts. The drawings are only for purposes of illustrating a preferred physical arrangement or embodiment and are not to be construed as limiting the invention.

FIG. 3 is a top plan view in partial section of a deceleration and positioning mechanism for decelerating and positioning workpiece carriers relative to the work station modules;

FIG. 4 is a side elevational view of the deceleration and positioning module of FIG. 3; and, FIG. 5 is a diagrammatic top plan view of a plurality of work stations modules interconnected into a linear free flow manufacturing and assembly system.

DETAILED DESCRIPTION OF THE PREFERRED EMBODIMENT

Figure 1:
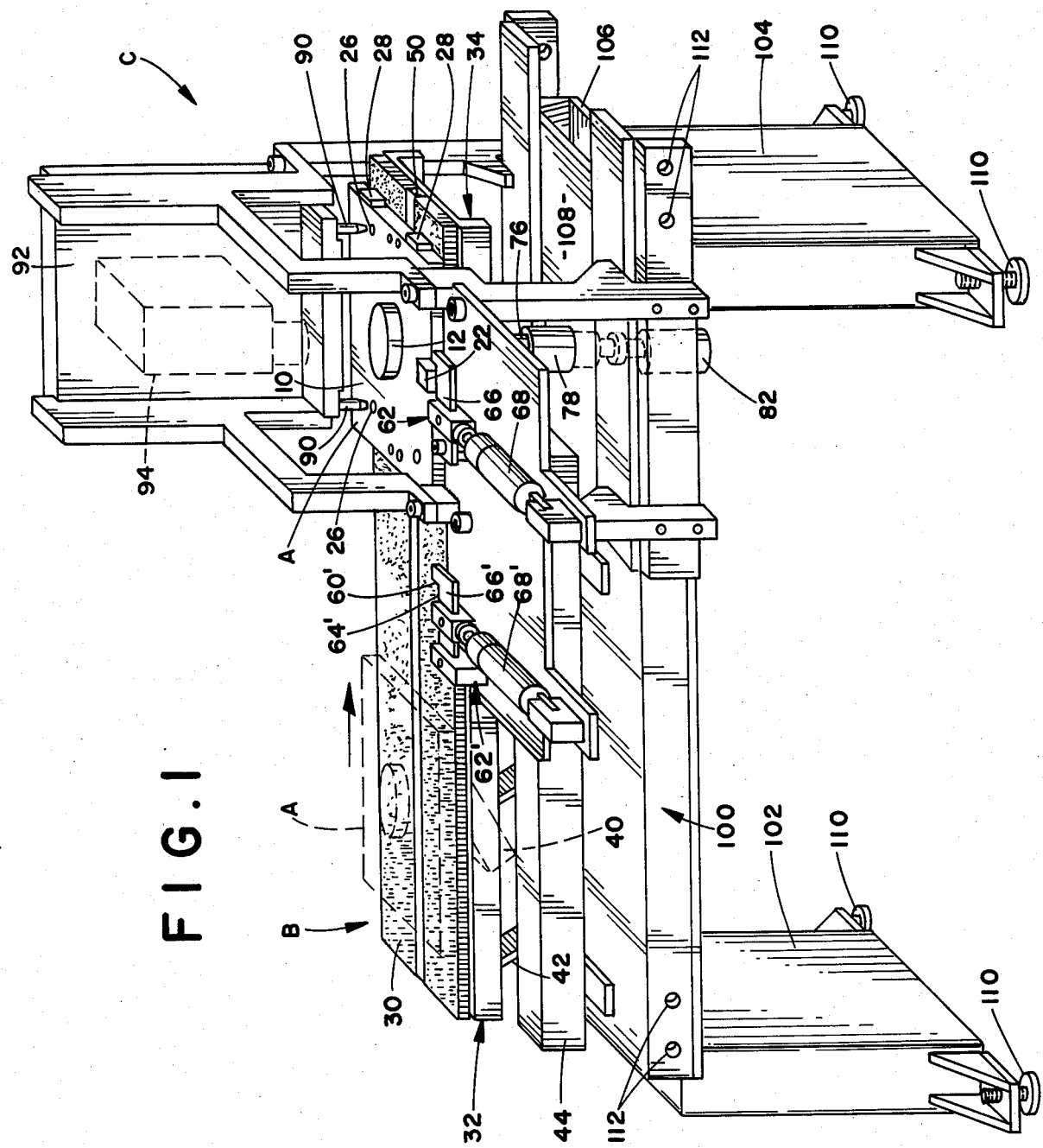
FIG. 1 is a perspective view of a work station module constructed in accordance with the present invention.

FIG. 1 illustrates a work station module for handling a plurality of workpiece carriers or boats A. The module includes a buffer storage area B for transitory storage of a plurality of the carriers which it receives at non-specific intervals and an escapement station C which facilitates performance of a manufacturing operation on the workpiece carried by each carrier. The interval between operations of the escapement station is not necessarily coextensive with the interval between receiving workpiece carriers. The escapement station operates on a "permissive" type cycle in which it commences an operation in response to its completion of the preceding operation and the arrival of a new carrier rather than in response to the cycling of another machine or escapement station. This allows each escapement station to cycle at the highest speed possible for the operation which it performs.

Figure 2:
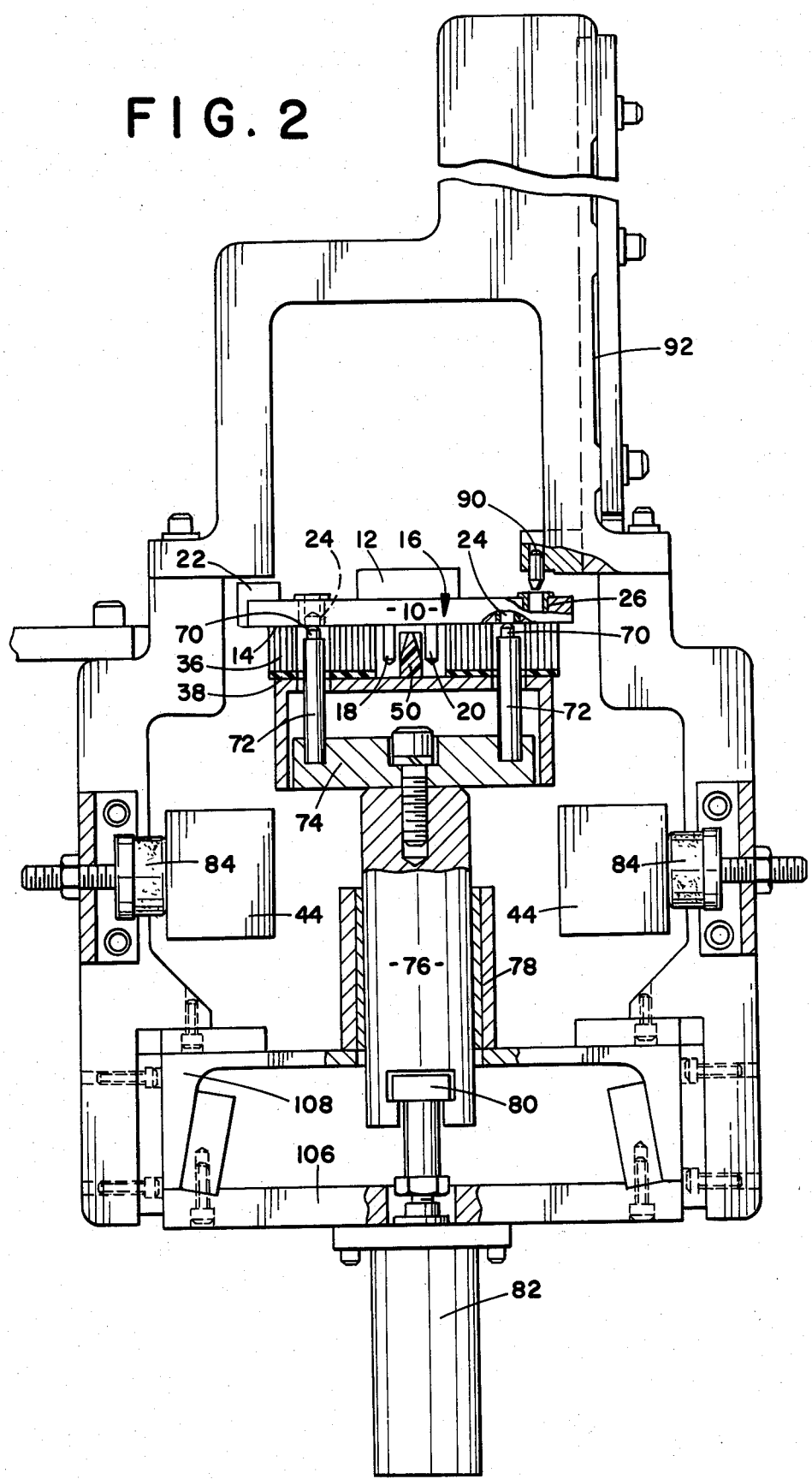
FIG. 2 is an end elevational view of an escapement station of the module of FIG. 1 in partial section.

With reference to FIGS. 1 and 2, the workpiece carriers A include a wide flat base 10 on which at least one nest 12 or other means for mounting a workpiece is disposed. Optionally, a plurality of nests may be provided to allow the escapement station to operate simultaneously on a plurality of workpieces per carrier. For simplicity of illustration, the nest 12 is shown in the form of a hollow cylinder disposed on the upper surface of the carrier for holding the workpieces. Other nests or workpiece mounting means such as threaded bores in the base 10 to receive bolts through the workpieces, bores in the base to receive pins projecting from the workpieces, magnets imbedded in the base, spring clips mounted on the base, and the like are also contemplated as nests for mounting the workpieces on the carrier with a preselected orientation and position.

With particular reference to FIG. 2, the carrier has a planar, conveyor engaging surface 14 which, optionally, may be abraded or grooved. The carrier also includes a guide means 16 for guiding the position and orientation of the carrier relative to the buffer storage area B and the escapement station C. The carrier guide means includes means for defining at least one guide or directing rail receiving slot on the engaging surface. In the preferred embodiment, the carrier guide means defines the guide rail receiving slot with at least one pair of guide pins 18, 20 and preferrably with two pairs. Optionally, the guide slot may be defined by a pair of continuous or discontinuous strips, by a channel cut into the engaging surface 14, or the like.

The carrier further includes alignment means for aligning the carrier with the escapement station. The alignment means includes first, second, and third aligning means for progressively aligning the carrier more accurately with the escapement station. The first aligning means includes a flag 22 which may also carry encoded information. The second aligning means includes a plurality of lower alignment apertures or bushings 24 in the engaging surface 14. The third aligning means includes a plurality of precision hardened pin receiving bushings 26 disposed on the upper surface of the carrier base 10. Each carrier also includes resilient bumpers 28 for reducing jarring when carriers meet.

Continuing with reference to FIGS. 1 and 2, the buffer storage area B includes a conveying surface 30 along which workpieces are moved from a first or upstream end 32 toward a second or downstream end 34. The conveying surface 30 is defined by a multiplicity of fibers 36 which project from a layer of resilient plastic layer 38. One end of each fiber is imbedded in the plastic layer 38 and the free end is adapted to engage the engaging surface 14 of the carriers A. As is already known, the fibers slope a few degrees from vertical with the free ends thereof being angled toward the downstream end 34 of the module. In the preferred embodiment, the fibers are polypropylene, although other resilient, wear-resistant fibers may be used to advantage.

A motivating means, includes a motor 40 which selectively causes the conveying surface to undergo a mode motion which includes vertical and longitudinal components of motion. In the preferred embodiment, a major forward component of the motion is along a line about 15 to 20 degrees above horizontal. The fibers lean forward at about 50° to 75° relative to the line of movement. A plurality of leaf springs 42 connect the motor, the conveying surface 30, and counter weight 44. The motivating means urges the fibers against the carriers A causing the fibers to buckle slightly and raise the carriers as they attempt to resume their straight characteristic. This vibration of the inclined, resilient fibers results in a fast, quiet, and abrasion-free conveying action.

With particular reference to FIG. 2, the guide means 16 further includes directing means for interacting with the carrier slot for directing the carriers along the conveying surface 30. In the preferred embodiment, this directing means includes a central guide or directing rail 50 which is received between guide pins 18, 20 of the carrier. Optionally, additional guide or directing rails may be received in the additional guide slots of the carriers. The guide or directing rail, in the preferred embodiment, has a frictional reducing surface of TEFLON, NYLON, fibers, or the like, for inhibiting lateral movement of the carriers with a minimum of drag. More particularly, the rail is constructed of the friction reducing material and has a generally rectangular cross section. Adjacent the escapement station C, the rail 50 has a tapered upper surface to facilitate return of the carrier after the performance of a work operation.

In the preferred embodiment shown, the directing rail 50 is connected with the conveying surface 30 to undergo vibratory motion therewith. Because each carrier is supported directly by the fibers 36 and not by the directing rail 50, the guide means may take other forms, such as a pair of side rails received in a corresponding grooves in the carrier or the like. Alternately, bearings or rollers may be provided between the guide pins or rollers 18 and 20 or the engaging surface, and the directing rail 50. It is to be appreciated that the fibers 36 are able to carry relatively heavy loads, on the order of five pounds or so per square inch of carrier base 10. The load carrying capability does, however, vary with the fiber density, and the composition density, and denier of the fibers.

Still referring to FIGS. 1 and 2, the escapement station C of the preferred embodiment is disposed downstream from the buffer storage area B of the same module toward the second end 34 of the conveying surface 30. Optionally, the buffer storage area may be adjacent the downstream end to serve an escapement station at the upstream end of the next module. It will be appreciated that the escapement station may take various forms which are particularly adapted to perform selected workpiece operations.

The alignment means includes escapement station mounted portions for interacting with the carrier mounted portions of the first, second, and third aligning means for progressively aligning and precisely fixing the position of the carrier relative to the escapement station. With particular reference to FIGS. 1, 3, and 4, the escapement station portion of the first aligning means includes a first retractable, stop surface 60 which selectively engages the forwardmost face of the flag 22. The first stop surface is selectively retractable to allow the aligned boat to advance after the appropriate operation has been performed at the escapement station.

More specifically, the first aligning means operates in conjunction with a decelerating means 62 for smoothly decelerating and stopping each received carrier. The decelerating means includes a friction surface 64 which frictionally engages a leading outside corner or edge of the flag 22 causing a drag thereon. The first stop surface 60 and the friction surface 62 are portions of a pivotally mounted deceleration and stopping member 66. A control cylinder 68 selectively controls pivoting of the deceleration and stopping member 66. Specifically, the air cylinder biases the deceleration and stopping member toward the carrier path such that it engages the outward surface of the flag and is pivoted toward the cylinder by the interaction therewith. The degree and rapidity with which the deceleration and stop member 66 yields is determined by the biasing force applied by the cylinder 68. In the preferred embodiment, the cylinder 68 is an air cylinder into which compressed air is directed. By selectively adjusting the pressure in the air cylinder, the deceleration rate of the carriers is selectively adjusted. After the operation has been performed by the escapement station and the carrier is to pass downstream, the cylinder 68 is selectively actuated to withdraw the first stop surface 60 from interaction with the flag.

The deceleration means further includes a buffer storage area deceleration means 62' of substantially the same construction as the escapement station deceleration means 62. For simplicity of illustration, corresponding elements of the buffer deceleration means and the escapement station deceleration means are described with the same reference numerals but followed by a prime ('). A friction surface 64' of a deceleration and stop member 66' is biased into the path of a carrier flag by an air or other buffer area control cylinder 68'. As one or a plurality of carriers in the buffer storage area advance, the frictional interaction between the flag and the friction surface 64' decelerates the carriers. The selective yielding of the buffer area control cylinder 68' determines the rate of deceleration. In the preferred embodiment, the buffer area deceleration control cylinder 68' supplies a greater biasing force than escapement station deceleration control cylinder 68 because the buffer decelerating means 62' commonly decelerates a plurality of carriers, i.e., many times greater mass than the escapement station decelerating means 62 which only decelerates a single carrier. The buffer area deceleration control cylinder 68' is selectively retractable such that a stop surface 60' disengages the forwardmost face of the carrier flag allowing the leading carrier in the buffer storage area to advance to the escapement station.

Referring again to FIGS. 1 and 2, the escapement station mounted portion of the second aligning means is disposed in association with a conveying surface disengaging means for selectively lifting or disengaging the carrier from the conveying surface 30. This prevents an operation performed at the escapement station from interfering with the vibratory motion of the conveying surface. Conversely, this prevents the vibratory motion of the conveying surface from interfering with the performed operation. The second aligning means includes a plurality of tapered alignment pins 70 which are mounted on associated lifting arms 72. The alignment pins are selectively received in the lower bushings 24 as shoulders on the lifting arms raise the carrier. In this manner, as the lifting arms 72 move upward to lift the carrier from the conveying surface, the tapered pins 70 and the lower bushings 24 align the carrier with the escapement station. The lifting arms extend through enlarged openings in the conveying surface 30 and openings in the fibers 36 such that the lifting arms move through the conveying surface without interfering with its vibratory movement.

Further to the preferred embodiment, the lifting arms 72 are mounted on a platen 74 which is mounted on a shaft 76 that is non-rotatably mounted in a square bearing 78. A universal, T-drive-type coupling 80 joins the cylindrical shaft 76 with a lifting control cylinder 82, preferrably a pneumatic cylinder. To lift a received carrier, the cylinder 82 is selectively actuated causing the T-drive 80, the shaft 76, and the platen 74 to lift the lifting arms 72. A moderate clearance between the aligning pins 70 and the lower alignment apertures or bushings 24 allows the alignment pins to move smoothly into the lower alignment apertures or bushings. This smooth interaction permits the carrier to be lifted smoothly by the lifting arms without jostling the parts carried thereby.

Resilient dampers 84 are brought into intimate contact with the balance weights 44. This prevents lateral shifting of the balance weights which, in turn, prevents lateral shifting of the guide rail 50 during the work operation and assures dependable operation over a long period of time.

The escapement station mounted portion of the third aligning means includes a pair of hardened pins 90 which are received in the upper bushings 26 with a close tolerance. The progressively closer tolerances provided by the first, second, and third aligning means enable the third aligning means to provide very precise alignment between the workpiece and the escapement station. Further, the progressive alignment enables the aligning means, particularly the third aligning means, to have smooth interaction between the pins and bushings, hence, little wear and little jostling of carrier parts. The disengaging means moves the carrier and the upper bushings to the hardened pins 90. If desired, the alignment pins 90 may be connected with a switch for indicating that the carrier is properly aligned and starting the escapement station operation.

The escapement station further includes an escapement mounting means 92 for mounting an apparatus or tool 94 which performs the preselected escapement station operation. The mounting means 92 may take any number of different forms and is adapted to cooperate with the specific apparatus or tool 94 selected and/or required. Optionally, the escapement station may include a decoder for decoding information encoded on flag 22 to cause a corresponding operation to be performed by the escapement station, or an encoder for encoding the flag with information about the escapement station operation.

As shown in FIG. 1, the buffer storage area B and escapement station C are mounted on a frame structure which includes a horizontal supporting portion 100 and a pair of supports 102 and 104. These supports include horizontal supporting members 106 and 108 extending therebetween for supporting the horizontal supporting portions of a pair of adjacent modules. Leveling means 110 are advantageously provided to facilitate adjustment of conveying surface 30 to a substantially horizontal position. Various interconnecting means such as bolt holes 112 and the like allow each module to be accurately aligned and interconnected with an adjacent module.

In the free flow system, each carrier or boat A is received at the upstream end 32 of the conveying surface 30 of one or a first of the modules and is moved therealong by the vibratory motion of the fibers 36. Upon abutting another carrier in the buffer storage area B, the carrier stops moving and the fibers buckle and extend without moving the carrier forward. When the escapement station has completed a manufacturing operation, the escapement station stop surface 60 is withdrawn and the lift arms 72 lower the carrier from the escapement station C onto the vibrating conveyor surface. The carrier is then conveyed downstream along the conveying surface of the next adjacent module toward the buffer storage area thereof. The lead carrier in the buffer storage area is released by the buffer area stop surface 60', conveyed into the escapement station, and brought to a stop by the escapement station deceleration means 62 and stop 60, thus providing first or preliminary alignment without jarring or vibrating the transported workpiece. The line of carriers in the buffer storage area move forward and are decelerated by the buffer area deceleration means 62' and stop against the buffer area stop surface 60'. The lift arms 72 align and lift the carrier in the escapement station for performance of the work operation. The foregoing operational steps are then repeated.

It will be appreciated that the carriers are moved independently of the operation of other escapement stations. If an escapement station takes abnormally long to perform its operation, more carriers are accumulated in the buffer storage area of that module. Conversely, if the manufacturing operation is performed quickly, the number of carriers in the buffer storage area is reduced. In this manner, fluctuations in the time required for performing manufacturing operations or extricating bad parts at any modules in the line do not affect operation of the other modules. For example, in a ten operation non-synchronous assembly system, if each of the ten escapement stations operates with 95% productivity due to misformed parts and other malfunctions, the productivity of the non-synchronous assembly system is substantially 95%. By contrast in a ten operation synchronous system in which each of the operations has a 95% productivity, the productivities are compounded and the overall productivity of the system is $0.95_{10}$ or 59.9%. In an assembly system with a machine rate of 60 parts per minute, over 2.5 million additional parts per year are produced by the non-synchronous assembly system.

Figure 5:
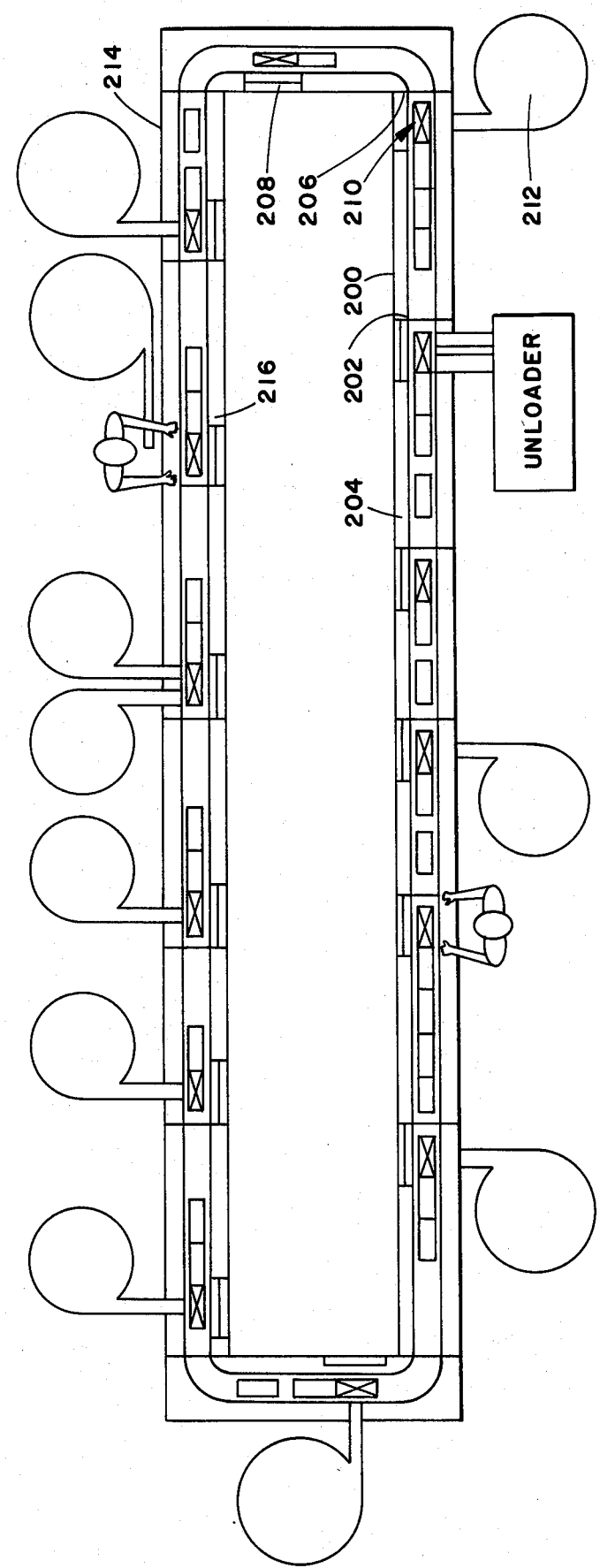

Referring now to FIG. 5, a free flow system is illustrated which is made up of a plurality of the modules. Each of the modules may be like FIG. 1. Optionally, some of the modules may have only a buffer storage area with no escapement stations; other modules may have a plurality of escapement stations. The plurality of escapement stations need not have buffer storage areas therebetween. The work station modules are interconnected in a closed loop so that each carrier may circulate sequentially from escapement station to escapement station independently of the movement of the other carriers. A work station module 200 has an upstream end 202 at which it receives workpiece carriers from a preceding module 204 and a downstream end 206 at which it discharges carriers to a subsequent module 208. The module 200 includes an escapement station 210 at which an operation is performed. In the example of FIG. 5, the escapement station 210 includes a vibratory bowl feeder 212 for orienting and feeding components to be added to the workpiece held on each carrier. An exemplary operation may be placing a bearing race into the nest 12 of the carrier. As a further example, the subsequent work station module 208 might grease the race, a later work station module 214 may add a plurality of bearings to the race, and so on. The work station modules may be automatic as illustrated by modules 200, 208, and 214, or may be manual as illustrated at module 216. In a manual operation module, each carrier is held in the escapement station as an operator performs a manual assembly operation, inspection, or the like. It is contemplated that the system may be built initially with all manual assembly operations. As the production rate increases, the slowest manual assembly operations are replaced with automatic assembly tools. Further, if one of the automated modules malfunctions, the automatic tool may be disconnected so that an operator may perform the same manufacturing operation manually.

It will be appreciated that the modules may be connected in other than a linear line. For example, if several of the operations to be performed by the escapement means take longer than the others, a switching means may connect the second end of one of the modules with a pair of lines of interconnected modules such that alternate carriers are conveyed into each of the two parallel lines. The switching means may include a pivotally mounted center directing rail and controller for selectively moving the rail to direct a carrier along a selected one of the plurality of lines. At the end of the parallel lines, all carriers may be fed to the first end of a common module such as with a Y-like connection portion of the central rail. The modules may be interconnected in various arrangements of linear paths, parallel paths, bypasses, and the like as required by the operation to be performed.

The invention has been described with reference to the preferred and alternative embodiments. Clearly, modifications and alterations will become apparent to others upon a reading and understanding the preceding detailed description. It is intended that the invention be construed to include all such modifications and alterations insofar as they come within the scope of the appended claims or the equivalents thereof.

Having thus described a preferred embodiment, the invention is now claimed to be:

1. A system for conveying the workpieces comprising:
    a plurality of workpiece carriers for carrying workpieces, each workpiece carrier having at least one nest means for receiving and holding a workpiece;
    a conveying surface along which the workpiece carriers are moved, the conveying surface including a multiplicity of resilient fibers projecting outward therefrom to engage the workpiece carriers;
    vibrating means for vibrating the conveying surface, such that the carriers move therealong;
    at least one directing rail mounted on the conveying surface adjacent the resilient fibers and a rail receiving slot defining means on the carrier for receiving the conveying surface directing rail therebetween, each carrier being supported by the fibers and being disposed in a non-supported association with the directing rail, the directing rail terminating in an upper surface disposed below upper ends of the fibers such that the carrier is supported by the fibers rather than the directing rail and is disposed generally centrally along the conveying surface with the fibers spaced a short distance therefrom and wherein the slot defining means includes a plurality of pins extending downward from the carrier fiber engaging of pins extending downward from the carrier fiber engaging surface into the space defined between the fibers and the guide rail; and,
    an alignment means for aligning the carriers in a predetermined relationship with a work station whereby a preselected operation can be performed automatically on the carrier workpiece.

* * * * *